United States Patent
Yamane

(10) Patent No.: US 7,234,497 B2
(45) Date of Patent: Jun. 26, 2007

(54) TYRE FOR MOTORCYCLE

(75) Inventor: Masakatsu Yamane, Kobe (JP)

(73) Assignee: Sumitomo Rubber Industries, Ltd., Kobe-shi, Hyogo (JP)

( * ) Notice: Subject to any disclaimer, the term of this patent is extended or adjusted under 35 U.S.C. 154(b) by 240 days.

(21) Appl. No.: 10/909,543

(22) Filed: Aug. 3, 2004

(65) Prior Publication Data

US 2005/0039835 A1    Feb. 24, 2005

(30) Foreign Application Priority Data

Aug. 21, 2003   (JP)   ............... 2003-208310

(51) Int. Cl.
  *B60C 11/13*   (2006.01)
(52) U.S. Cl. ............... 152/209.11; 152/209.18; 152/209.23
(58) Field of Classification Search ........... 152/209.18, 152/209.24, 209.11, 209.23
  See application file for complete search history.

(56) References Cited

U.S. PATENT DOCUMENTS

| | | | | |
|---|---|---|---|---|
| 4,284,115 A * | 8/1981 | Ohnishi | ............ | 152/209.24 |
| 5,044,414 A * | 9/1991 | Ushikubo | ............ | 152/209.24 |
| 5,327,952 A * | 7/1994 | Glover et al. | ............ | 152/209.26 |
| 5,679,185 A * | 10/1997 | Tanaka | ............ | 152/209.26 |
| 2001/0035245 A1 * | 11/2001 | Ikeda | ............ | 152/209.24 |
| 2003/0116247 A1 * | 6/2003 | Armellin et al. | ............ | 152/209.24 |
| 2005/0115653 A1 * | 6/2005 | Miyasaka et al. | ............ | 152/209.1 |

FOREIGN PATENT DOCUMENTS

| | | | |
|---|---|---|---|
| EP | 368553 | * | 5/1990 |
| EP | 0 822 103 A1 | | 2/1998 |
| JP | 2-133206 A | | 5/1990 |
| JP | 5-338412 A | | 12/1993 |
| JP | 08-169211 | * | 7/1996 |
| JP | 10-29409 A | | 2/1998 |
| JP | 11-123909 A | | 5/1999 |
| JP | 2001-121923 A | | 5/2001 |

* cited by examiner

*Primary Examiner*—Steven D. Maki
(74) *Attorney, Agent, or Firm*—Birch, Stewart, Kolasch & Birch, LLP

(57) ABSTRACT

A tire for a motorcycle wherein the radius of curvature (R1) of a corner portion on one side (an inside in an axial direction) of a groove of the tire is smaller than a radius of curvature (R2) of the other corner portion; the radii of curvature (R1) and (R2) are set to be 2 mm or more; a first phantom circle for defining the corner portion is inscribed on a second phantom circle for defining the corner portion; the point of contact of the first phantom circle and the second phantom circle is positioned on the outside from the center of a groove; and the distance between the center of the groove and the point of contact is equal to or smaller than one fifth of the width (B) of the groove.

5 Claims, 6 Drawing Sheets

TYRE FOR MOTORCYCLE

This application claims priority on Patent Application No. 2003-208310 filed in Japan on Aug. 21, 2003.

BACKGROUND OF THE INVENTION

1. Field of the Invention

The present invention relates to a structure of a tire to be employed for a motorcycle.

2. Description of the Related Art

As shown in FIG. 5, in a tire 1 for a motorcycle (which will be hereinafter referred to as a "tire"), a tread surface 2 takes such a shape as to be curved outward in a radial direction and a groove 3 is formed on the tread surface 2. The tire 1 is attached to the motorcycle. When the motorcycle runs, the total weight of a vehicle including the weight of a driver is applied to the tire 1. Therefore, a portion with which the tire 1 comes in contact is flattened.

When a state in which the tire 1 does not come in contact with a ground as shown in FIG. 6(*a*) is changed to a state in which the tire 1 comes in contact with the ground as shown in FIG. 6(*b*), a contact surface portion 4 is flattened and the groove 3 is also deformed elastically. More specifically, wall surfaces 5 and 6 of the groove 3 are flexed so that both of them approach each other and an opening portion 7 of the groove 3 is reduced. In other words, an opening edge portion 9 of the groove 3 is displaced by S1 outward in an axial direction of the tire 1 (the direction of an arrow 8) and an opening edge portion 10 of the groove 3 is displaced by S2 inward in the axial direction.

At this time, the tread surface 2 of the tire 1 is curved as described above. Therefore, the displacement S2 of the opening edge portion 10 is greater than the displacement S1 of the opening edge portion 9. The tire 1 rolls over a road surface. Therefore, the opening edge portions 9 and 10 periodically repeat the elastic deformation. For this reason, the opening edge portion 10 is worn more greatly than the opening edge portion 9 so that the tire 1 causes a so-called partial wear.

The tread surface 2 is curved as described above. Therefore, a length in a circumferential direction of the tread surface 2 is gradually shortened outward in the axial direction. In the case in which the tire 1 rolls over the road surface, accordingly, a slip tends to be generated between the tire 1 and the ground toward the outer portion in the axial direction over the tread surface 2. For this reason, the opening edge portion 10 tends to be worn still more greatly than the opening edge portion 9. As a result, there is a problem in that the lifetime of the tire 1 is shortened due to the partial wear.

SUMMARY OF THE INVENTION

The present invention has been made in such a background. It is an object of the present invention to provide a tire for a motorcycle which can prevent a partial wear and can maintain a performance for a long period of time.

The present inventor thought that the above-mentioned object could be attained if the opening edge portion of a groove which is formed on a tread surface can be displaced equally because the partial wear is caused by the uneven displacement of the opening edge portion of the groove, that is, the great deformation of the opening edge portion provided on an outside in an axial direction.

Therefore, the present invention provides a tire for a motorcycle comprising a tread portion having a tread surface curved outward in a radial direction, and a groove constituting a tread pattern formed on the tread surface. An internal wall surface of the groove has a substantially U-shaped configuration in which a pair of corner portions is formed to be arcuate surfaces. A radius of curvature of the arcuate surface constituting one of the corner portions which is positioned on an inside in an axial direction is set to be smaller than that of the arcuate surface constituting the other corner portion which is positioned on an outside in the axial direction.

According to the present invention, in the case in which the tire comes in contact with the ground, a part of the tread surface is flattened so that a contact surface is formed. A load is applied to a portion of the contact surface which is provided with the groove from the opening portion side of the groove inward in the radial direction of the tire. The tread surface is curved. Therefore, the load is applied more acutely in an oblique direction to the portion in the opening edge portion of the groove which is positioned on the outside in the axial direction of the tire than the portion in the opening edge portion of the groove which is positioned on the inside in the axial direction of the tire. Accordingly, the portion in the opening edge portion of the groove which is positioned on the outside in the axial direction of the tire tends to be displaced more greatly in the axial direction than the portion in the opening edge portion of the groove which is positioned on the inside in the axial direction of the tire.

However, the groove is formed like an almost U shape and a radius of curvature of the corner portions constituting an internal wall surface which is positioned on the inside in the axial direction is set to be smaller than that of the corner portions which is positioned on the outside in the axial direction. In the case in which the load is applied to the tire, therefore, a portion of the internal wall surface of the groove which is positioned on the inside in the axial direction is deformed more easily than a portion of the internal wall surface of the groove which is positioned on the outside in the axial direction.

When the tire comes in contact with a ground, accordingly, a portion of the opening edge portion of the groove which is positioned on the inside in the axial direction is greatly deformed outward. Consequently, an amount of displacement of the opening edge portion positioned on the inside in the axial direction can be almost coincident with that of the opening edge portion positioned on the outside in the axial direction. More specifically, the partial wear of the tire can be prevented. As a result, the lifetime of the tire can be prolonged and a performance can be maintained for a long period of time.

It is preferable that the arcuate surfaces constituting the corner portions should be set to have radii of curvature of 2 mm or more respectively. Consequently, it is possible to avoid the concentration of a strain caused by the bend of the bottom of the groove. Thus, the bottom of the groove can be prevented from being broken.

The tire for a motorcycle may have such a structure that a first phantom circle for defining the arcuate surface constituting the corner portion provided on the inside in the axial direction is inscribed on a second phantom circle for defining the arcuate surface constituting the corner portion provided on the outside in the axial direction.

With this structure, the width of the groove can be prevented from being increased unnecessarily, and furthermore, there is increased a difference between the radius of curvature of one of the corner portions constituting the internal wall surface of the groove which is positioned on the inside in the axial direction and the radius of curvature of the other corner portion which is positioned on the outside in the axial direction. More specifically, the radius of curvature of the corner portion positioned on the inside in the axial direction can freely be set within a wide range with respect to the radius of curvature of the corner portion positioned on the outside in the axial direction. Accordingly, the amount of the displacement of the opening edge portion positioned on the inside in the axial direction of the groove and that of the opening edge portion positioned on the outside in the axial direction are coincident with each other more accurately. In addition, each of the corner portions is continuously provided very smoothly. Consequently, it is possible to avoid the generation of a great stress concentration when the opening edge portion of the groove is deformed.

It is desirable that the phantom points of contact of the first phantom circle and the second phantom circle should be positioned on the outside in the axial direction from a phantom normal which passes through the center of the opening portion of the groove and is orthogonal to a phantom tread line for defining the tread surface and a distance between the phantom normal and the phantom point of contact should be equal to or smaller than one tenth of the width of the groove.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DESCRIPTION OF THE PREFERRED EMBODIMENTS

The present invention will be described below in detail based on a preferred embodiment with reference to the drawings.

Figure 1:
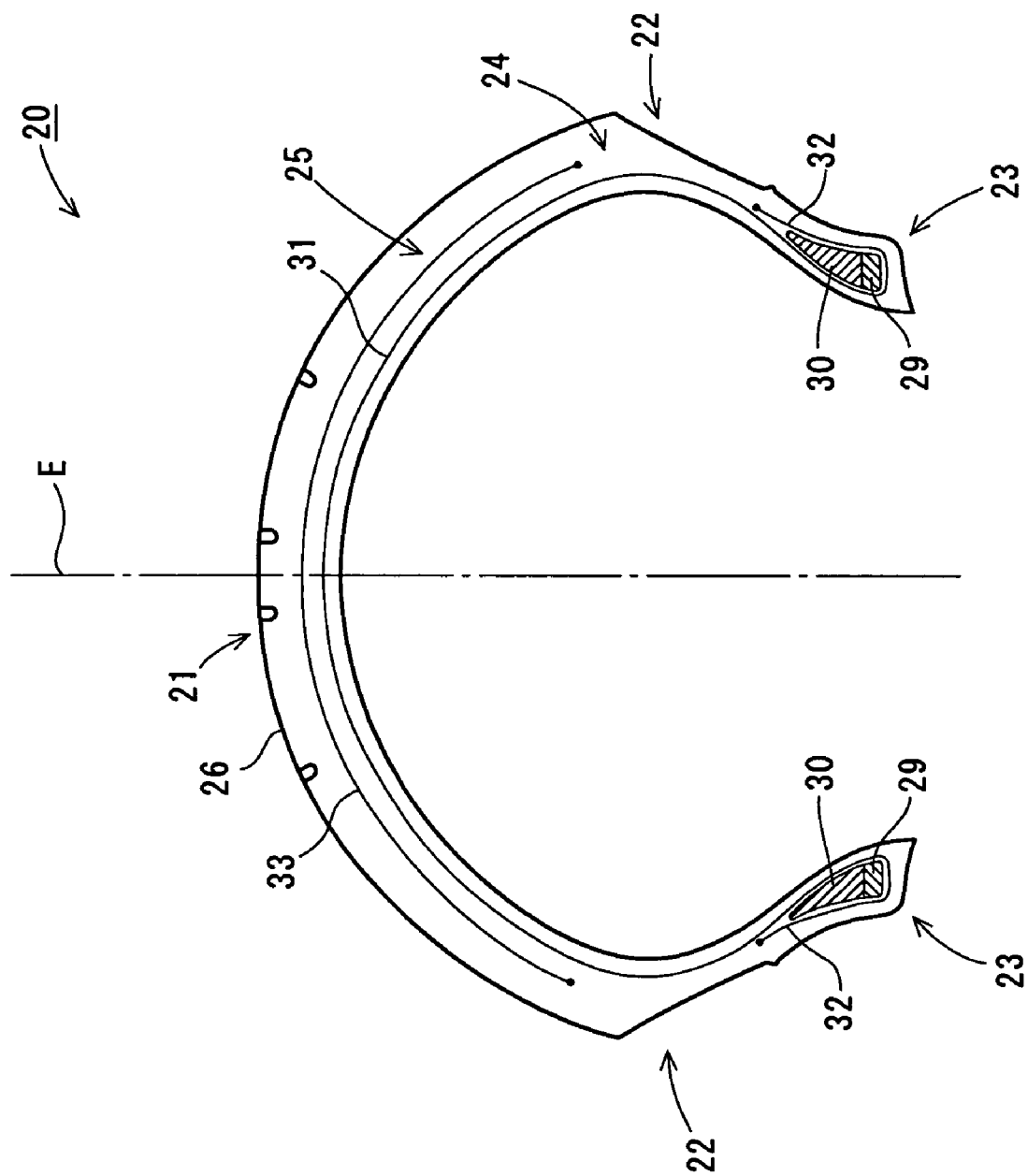
FIG. 1 is a sectional view showing the main part of a tire according to an embodiment of the present invention.
Figure 2:
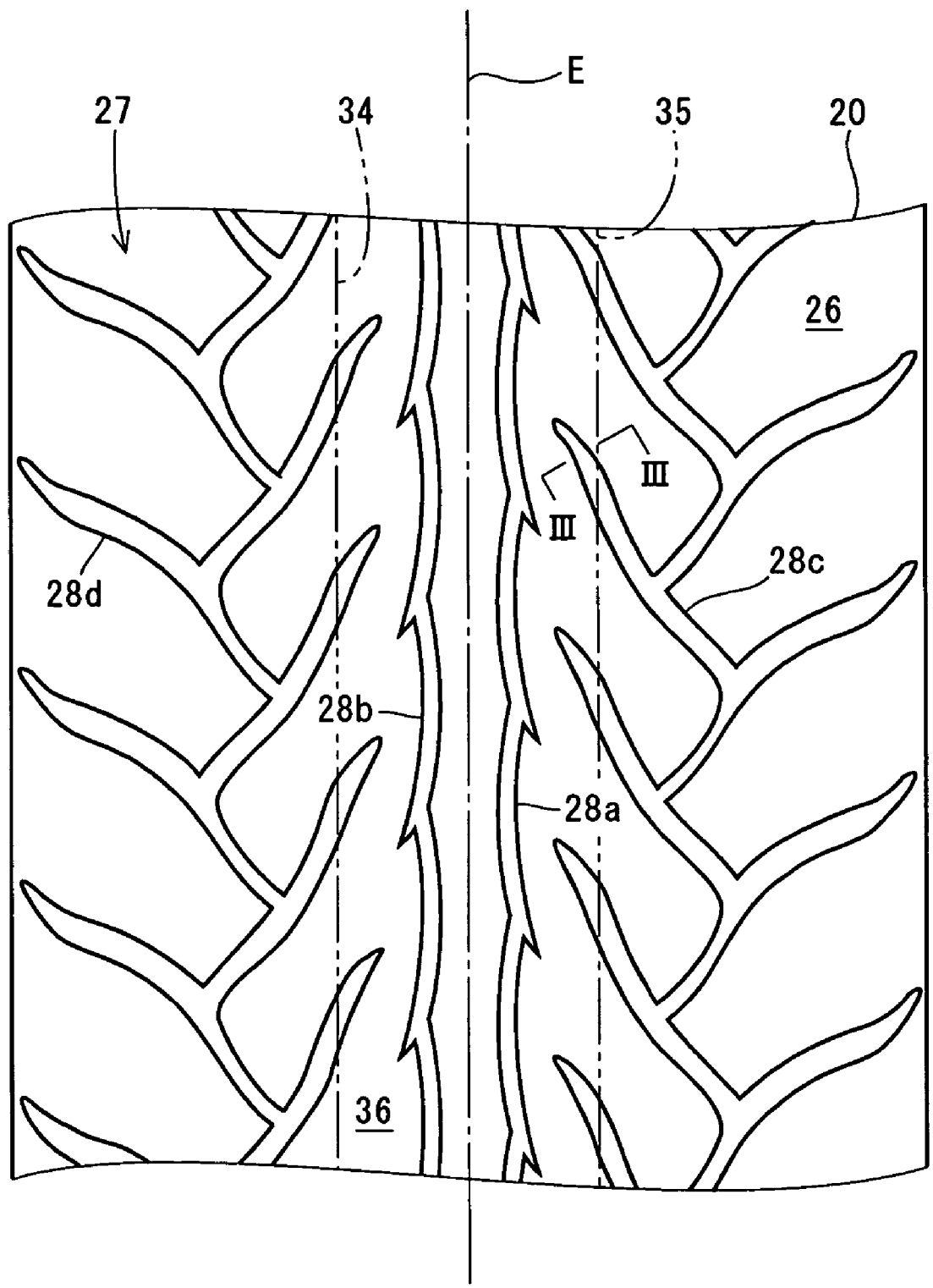
FIG. 2 is a plan view showing the main part of the tire according to the embodiment of the present invention.

FIG. 1 shows a section taken along a plane which passes through the center of a tire 20 for a motorcycle according to an embodiment of the present invention and is orthogonal to an equator plane E of the tire 20. In FIG. 1, a vertical direction is set to be a radial direction of the tire 20 and a transverse direction is set to be an axial direction of the tire 20. FIG. 2 shows a tread pattern 27 of the tire 20.

The tire 20 takes an almost symmetrical shape about the equator plane E excluding the tread pattern 27. The tire 20 comprises a tread portion 21, a sidewall portion 22, a bead portion 23, a carcass portion 24 and a band portion 25. The tread portion 21 is formed of a crosslinked rubber and a tread surface 26 thereof is formed like an arch to be an outward convex portion in the radial direction.

As shown in FIG. 2, the predetermined tread pattern 27 is formed on the tread surface 26. The tread pattern 27 is constituted by forming a groove 28 (28a to 28d) on the tread surface 26. The groove 28 is formed by a mold in a process of manufacturing the tire 20. The present embodiment features the shape of the internal wall surface of the groove 28. The internal wall surface of the groove 28 takes the following shape so that a so-called partial wear of the tire 20 can be prevented.

When the motorcycle carries out cornering, generally, a driver inclines the motorcycle inward in the cornering direction. At this time, the tire comes in contact with the ground at a camber angle with a road surface. A camber thrust is generated on the contact surface of the tire. The camber thrust is opposed to a centrifugal force generated when the motorcycle carries out the cornering. By the camber thrust, the motorcycle can carry out stable turning. In order to generate a stable camber thrust, the external surface of the tread portion 21, that is, the tread surface 26 is formed to draw a great arch as shown in FIG. 1.

The schematic structure of the tire 20 is as follows.

The sidewall portion 22 is continuously linked to the tread portion 21 and is extended inward in the radial direction from both ends of the tread portion 21. The sidewall portion 22 is also formed of a crosslinked rubber. The sidewall portion 22 is flexed to absorb a shock from the road surface. The sidewall portion 22 prevents external damage to the carcass portion 24.

The bead portion 23 is continuously linked to the sidewall portion 22. The bead portion 23 includes a bead core 29 and a bead apex 30. The bead apex 30 is extended outward in the radial direction from the bead core 29. The bead core 29 is formed circularly. The bead core 29 is constituted by a plurality of non-extensible wires (typically, wires formed of steel). The bead apex 30 is formed of a crosslinked rubber. The bead apex 30 is formed to be tapered outward in the radial direction.

The carcass portion 24 includes a carcass ply 31. The carcass ply 31 is provided along the inner peripheral surfaces of the tread portion 21, the sidewall portion 22 and the bead portion 23. An end 32 of the carcass ply 31 is laid over the bead core 29 and is extended toward the sidewall portion 22 side. The carcass ply 31 has a carcass cord. In the present embodiment, the carcass cord is provided to be extended in a direction of approximately 90 degrees with respect to the equator plane E of the tire 20. Indeed, it is a matter of course that the direction of the carcass cord is not restricted to this direction.

The band portion 25 includes a band ply 33. The band ply 33 is formed circularly and is provided on an outside in the radial direction of the carcass ply 31. Accordingly, the carcass ply 31 is reinforced by the band ply 33. The band ply 31 has a band cord which is covered with a topping rubber.

Figure 3:
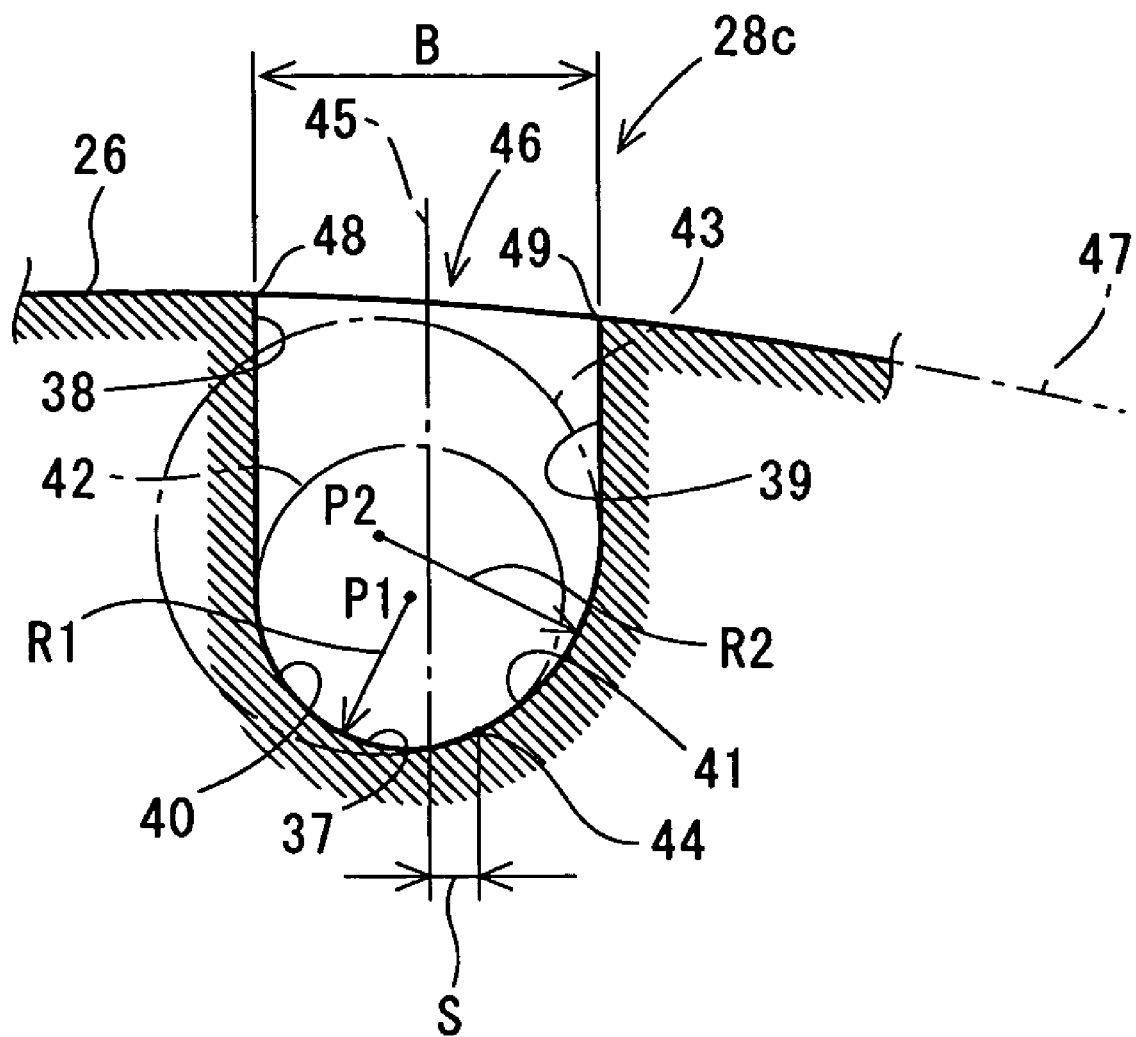
FIG. 3 is a sectional view taken along a III—III line in FIG. 2.

FIG. 3 shows a phantom section which is orthogonal to the longitudinal direction of a groove 28c formed on the tread surface 26. In FIG. 3, the shape of the internal wall surface of the groove 28c is shown in detail. The shape of the internal wall surface of the groove 28c will be described below. The following description is not restricted to the shape of the groove 28c but is applied to the sectional shape of the whole groove 28.

Each dimension of the tire 20 is measured in a state in which the tire 20 is incorporated in a normal rim and the tire 20 is filled with air to obtain a normal internal pressure, and the camber angle is 0 degree.

The normal rim implies a rim determined in a standard system including standards on which the tire 20 depends. "Measuring Rim" in the JATMA standards is the normal rim. The normal internal pressure implies an internal pressure determined in a standard system including the standards on which the tire 20 depends. A "maximum air pressure" in the LATMA standards, a "maximum value" described in "TIRE LOAD LIMITS AT VARIOUS PRESSURE" in the TRA standards and "INFLATION PRESSURE in the ETRTO standards are included in the normal internal pressures.

In FIG. 2, a region shown in two-dotted chain lines 34 and 35 is a portion to be a contact surface 36 when the tire 20 is caused to come in contact with the ground. In this case, "the tire 20 is caused to come in contact with the ground" implies a state in which a normal load is applied to the tire 20. The groove 28c is positioned on the end of the contact surface 36.

As described above, the normal load is applied in the radial direction of the tire 20 in the state in which the tire 20 is incorporated in the normal rim and the tire 20 is filled with the air in order to obtain a normal internal pressure, and the camber angle is 0 degree. The normal load includes a maximum load capacity defined in the JATMA, a maximum value described in the TRA table "TIRE LOAD LIMITS AT VARIOUS COLD INFLATION PRESSURES" or "LOAD CAPACITY" defined in the ETRTO. In the case of a tire for a motorcycle, the normal load is set to be approximately 50 to 60% of the maximum load capacity. In other words, the normal load usually implies a weight obtained by adding a weight corresponding to one passenger to the weight of the motorcycle body.

As shown in FIG. 3, the groove 28c is formed with the internal wall surface taking an almost U shape. More specifically, the internal wall of the groove 28c includes a bottom face portion 37 and sidewall portions 38 and 39. The sidewall portion 38 is positioned on the inside in the axial direction of the tire 20 and the sidewall portion 39 is positioned on the outside in the axial direction of the tire 20. The sidewall portions 38 and 39 are extended straight in the radial direction of the tire 20 or a direction crossing the radial direction at a constant angle, respectively. The bottom face portion 37 is formed to be linked to the sidewall portions 38 and 39 smoothly and continuously. In the present embodiment, a width B of the groove 28c is set to be 5.0 mm and a depth of the groove 28c is set to be 4.0 mm. Indeed, the width B and the depth of the groove 28c are properly designed and changed corresponding to the specifications of the tire 20.

The bottom face portion 37 is formed to be an acruate surface. Both ends of the bottom face portion 37 (that is, portions which are continuously linked to the sidewall portions 38 and 39) constitute corner portions 40 and 41 of the groove 28c. The corner portion 40 positioned on the inside in the axial direction is formed to be acruate around a center of curvature P1. The radius of curvature R1 of the corner portion 40 is set to be 2.0 mm in the present embodiment. The corner portion 41 positioned on the outside in the axial direction is formed to be arcuate around a center of curvature P2. The radius of curvature R2 of the corner portion 41 is set to be 4.0 mm in the present embodiment. Indeed, the radii of curvature R1 and R2 are properly designed and changed corresponding to the specifications of the tire 20. It is preferable that the radii of curvature R1 and R2 should be set to be 2 mm or more. In the present embodiment, the difference between the radius of curvature R1 and the radius of curvature R2 is set to be 2.0 mm. Their difference is properly set.

The shape of the corner portion 40 (the shape of the arcuate surface) is defined by a first phantom circle 42 having the radius R1 around the center of curvature P1. The shape of the corner portion 41 (the shape of the arcuate surface) is defined by a second phantom circle 43 having the radius R2 around the center of curvature P2. In the present embodiment, the first phantom circle 42 and the second phantom circle 43 come in contact with each other at a point of contact 44 (a phantom point of contact). The point of contact 44 is shifted by a distance s from the center of the groove 28c outward in the axial direction. In the present embodiment, the distance s is set to be 0.5 mm. Indeed, the distance s is properly designed and changed corresponding to the specifications of the tire. It is preferable that a ratio of the width B to the distance s should be s/B<0.2. Thus, functions and effects obtained by shifting the point of contact 44 outward in the axial direction of the tire 20 will be described below.

The center of the groove 28c is defined by a phantom normal 45. The phantom normal 45 passes through the center of an opening portion 46 of the groove 28c and is orthogonal to a phantom tread line 47 for defining the tread surface 26. The point of contact 44 is placed in a position which is shifted by the distance s from the phantom normal 45 outward in the axial direction of the tire 20. More specifically, in a state in which the first phantom circle 42 is inscribed on the second phantom circle 43 at the point of contact 44, the corner portion 40 is defined by a portion placed inward (leftward in the drawing) in the axial direction from the point of contact 44 and the corner portion 41 is defined by a portion placed outward (rightward in the drawing) in the axial direction from the point of contact 44.

Figure 4:
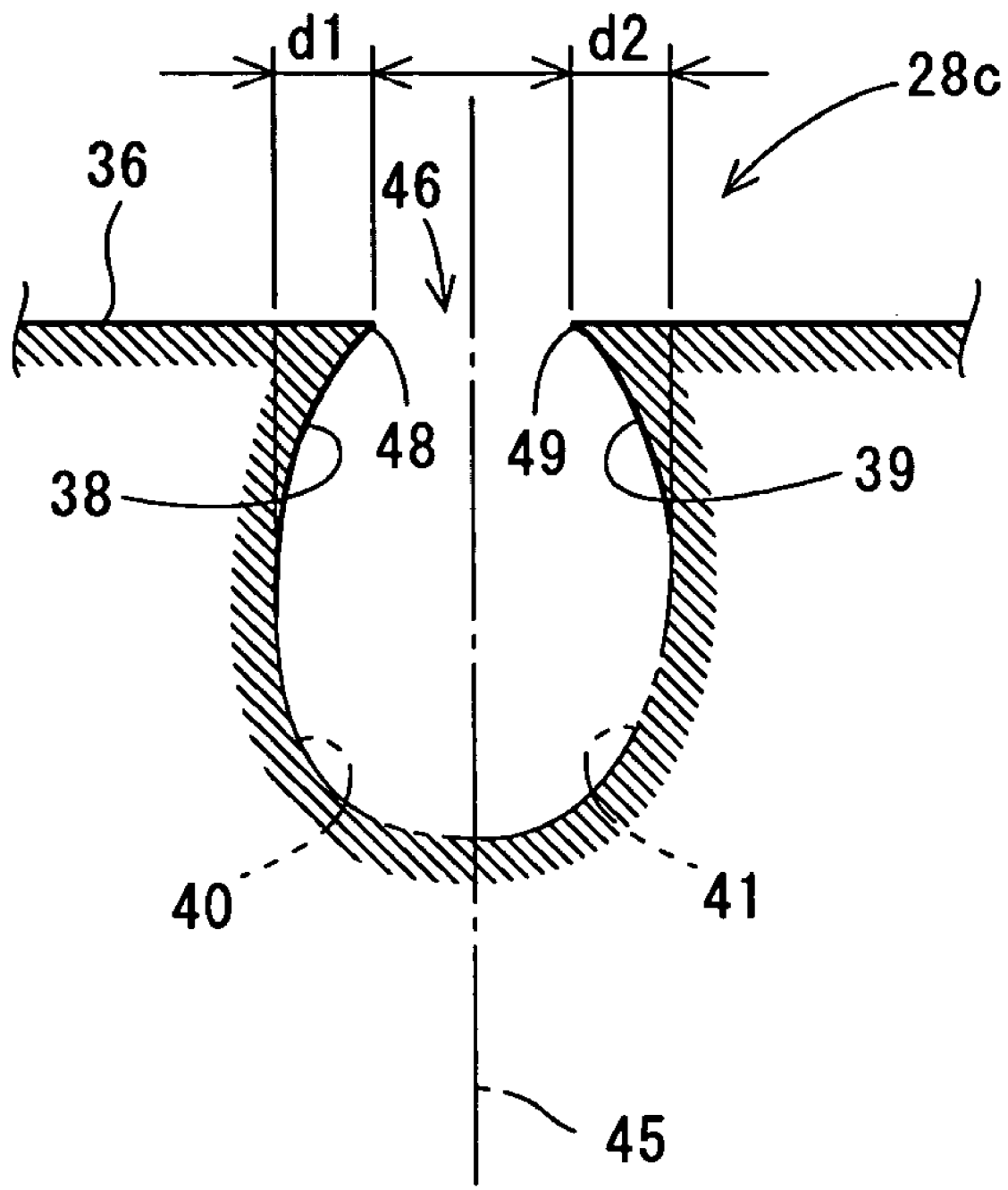
FIG. 4 is an enlarged sectional view showing the main part of the tire according to the embodiment of the present invention.
Figure 5:
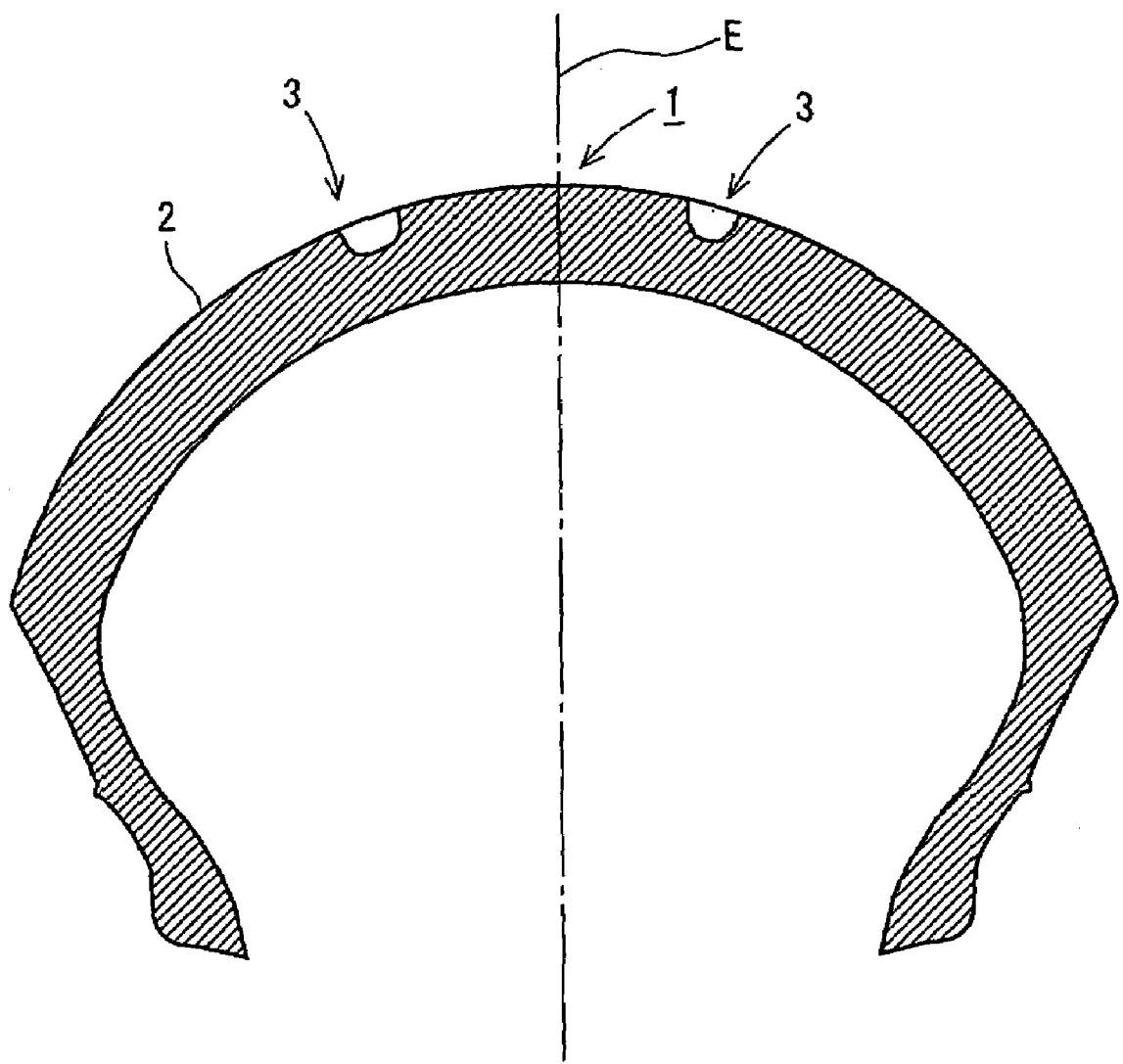
FIG. 5 is a sectional view showing the main part of a conventional general tire.
Figure 6A:
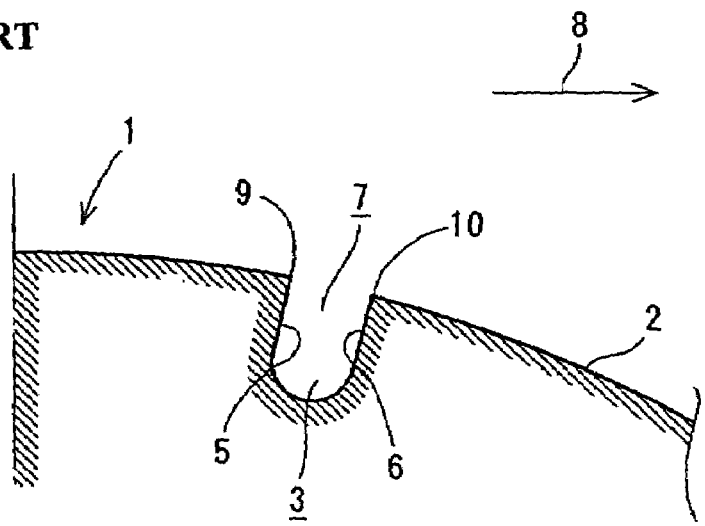
FIG. 6 is an enlarged view showing the main part of the conventional tire in a running state, (a) showing a state in which the tire does not come in contact with a ground and (b) showing, in detail, a contact surface portion in a state in which the tire comes in contact with the ground.
Figure 6B:
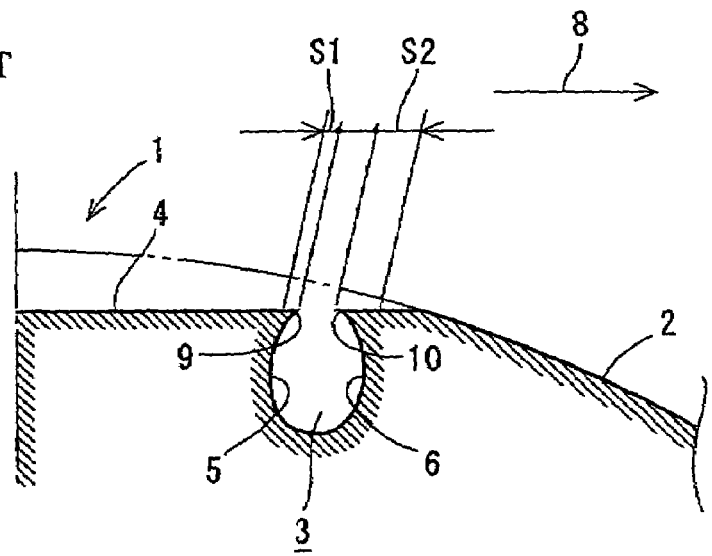

Next, a description will be given to the action of the tire 20 according to the present embodiment in the case in which the tire 20 is attached to the motorcycle and the motorcycle runs. FIG. 4 shows a state in which the tire 20 comes in contact with the ground. When the motorcycle is running, the tire 20 rolls over the road surface and the specific portion of the groove 28 (for example, the groove 28c) is compressed periodically in the radial direction.

When the tire 20 comes in contact with the ground, the tire 20 is compressed so that the contact surface 36 is formed. The tread portion 21 is constituted by a rubber. Therefore, the sidewall portions 38 and 39 constituting the groove 28c are elastically deformed and opening edge portions 48 and 49 of the groove 28c are displaced. More specifically, the opening edge portion 48 provided on the inside in the axial direction is displaced by a distance d1 outward in the axial direction and the opening edge portion 49 provided on the outside in the axial direction is displaced by a distance d2 inward in the axial direction.

In this case, the radius of curvature R1 of the corner portion 40 of the groove 28c is smaller than the radius of curvature R2 of the corner portion 41. When the tire 20 is compressed in the radial direction, therefore, a portion of the internal wall surface constituting the groove 28c which is placed on the inside in the axial direction is deformed more easily than a portion placed on the outside in the axial direction. When the tire 20 comes in contact with the ground, accordingly, the opening edge portion 48 of the groove 28c tends to be deformed greatly outward in the axial direction (a first effect).

On the other hand, the opening edge portion 49 of the groove 28c is positioned on the outside in the axial direction from the opening edge portion 48. When the tire 20 comes in contact with the ground, therefore, the opening edge portion 49 usually tends to be displaced more greatly than the opening edge portion 48 (a second effect).

In the present embodiment, the radii of curvature R1 and R2 are set to be the dimensions described above. Consequently, the first effect and the second effect interfere with each other. After all, the displacement distance d1 of the opening edge portion 48 is equal to the displacement distance d2 of the opening edge portion 49. For this reason, the partial wear of the tire 20 can be prevented. As a result, the lifetime of the tire 20 can be prolonged and a good performance can be maintained for a long period of time.

Moreover, the radii of curvature R1 and R2 of the corner portions 40 and 41 are set to be 2 mm or more, respectively. Therefore, it is possible to avoid the concentration of a strain caused by the bend of the bottom of the groove. Consequently, the bottom of the groove can be prevented from being broken.

In the present embodiment, particularly, the corner portions 40 and 41 are defined by the first phantom circle 42 and the second phantom circle 43 respectively in the state in which the first phantom circle 42 is inscribed on the second phantom circle 43. Therefore, the width B of the groove 28c can be prevented from being unnecessarily increased and the difference between the radius of curvature R1 of the corner portion 40 and the radius of curvature R2 of the corner portion 41 is increased. Accordingly, the radius of curvature R1 of the corner portion 40 can be freely set within a wide range with respect to the radius of curvature R2 of the corner portion 41. As a result, the amounts of displacement of the opening edge portions 48 and 49 in the groove 28c are coincident with each other more accurately so that the partial wear of the tire 20 can be reduced still further. In addition, the first phantom circle 42 is inscribed on the second phantom circle 43. Consequently, the corner portion 40 and the corner portion 41 are continuously provided very smoothly. Consequently, a large stress concentration is not caused when the opening edge portions 48 and 49 are deformed.

In the present embodiment, the point of contact 44 of the first phantom circle 42 and the second phantom circle 43 is shifted by the distance s from the phantom normal 45. The distance s is set to be one tenth or less of the width B of the groove 28c. For this reason, the portion having the radius of curvature R2 occupies 40% or more of the groove 28c. Accordingly, the difference between the portion having the radius of curvature R1 and the portion having the radius of curvature R2 is clear. In other words, a difference between the wear resistance effect of the portion having the radius of curvature R1 and the partial wear resistance effect of the portion having the radius of curvature R2 is clear. As a result, the partial wear of the tire 20 can be reduced still more.

While the above description relates to the shape of the internal wall surface of the grove 28c, it is applied to the whole groove 28 as described above. The tire 20 is attached to the motorcycle and rolls over the road surface with the running of the motorcycle. Therefore, the dispute of the local partial wear of the tire 20 is useless. Importantly, it is possible to produce such an advantage that a partial wear in the whole circumferential direction of the tire 20 rolling over the road surface can be avoided.

In order to produce such an advantage, the shape of the internal wall surface of the groove 28 does not need to be the same as the shape of the internal wall surface of the groove 28c over the whole periphery of the tire 20. Indeed, it is ideal that the internal wall surface of the groove 28 takes the same shape as the shape of the internal wall surface of the groove 28c. In order to produce the advantage, at least 50% of the sum of the length in the longitudinal direction of the groove 28 (the grooves 28a to 28c) included in the contact surface 36 (the region shown in the two-dotted chain lines 34 and 35 in FIG. 2) formed when a normal load is applied should take the same shape as the shape of the internal wall surface of the groove 28c.

EXAMPLES

Next, the effects of the present invention will be described with reference to examples. The present invention should not be construed to be restricted based on the description of the examples.

Referring to the performance of a tire according to an example of the present invention, Table 1 shows a result obtained by the execution of a comparison test for a comparative example. The size of a tire according to each of the examples and the comparative example is 120/70ZR18M/C (59W)D220FST T/L. In the comparison test, a difference in a tire wearing way depending on a difference in the shape of the groove of the tire is measured. The shape of the groove of the tire is specified by a radius of curvature R1 of a corner portion provided on an inside in an axial direction, a radius of curvature R2 of a corner portion provided on an outside in the axial direction, and the presence of the point of contact of a phantom circle for defining each of the corner portions and a position thereof. The initial depth of the groove of the tire is 4.0 mm. The performance of the tire is decided depending on the presence of a partial wear. The shape of the groove of the tire according to each of the examples and the comparative example is as follows.

The tire according to the comparative example has a radius of curvature R1 of 2.5 mm and a radius of curvature R2 of 2.5 mm, and has no point of contact of a phantom circle.

The tire according to an example 1 has a radius of curvature R1 of 2.0 mm and a radius of curvature R2 of 4.0 mm, and the point of contact of a phantom circle is present on an outside in an axial direction from a phantom normal passing through the center of a groove. The point of contact is positioned at a distance of {fraction (1/10)} of a width B of the groove from the phantom normal.

The tire according to an example 2 has a radius of curvature R1 of 2.3 mm and a radius of curvature R2 of 3.0 mm, and the point of contact of a phantom circle is present on an outside in an axial direction from a phantom normal passing through the center of a groove. The point of contact is positioned at a distance which is greater than {fraction (1/10)} of the width B of a groove and is smaller than 1/6 thereof from the phantom normal.

In the comparison test, the tire according to each of the comparative example and the examples is attached to a motorcycle and a driver accelerates the motorcycle to a speed of 120 km/h, and then carries out full braking (ABS operation) to decelerate the motorcycle to 40 km/h. The driver performed and repeated this operation every 500 m until a mileage of 1500 km was obtained. Depths on the inside and outside in the axial direction of the groove of the tire were measured respectively after the running (Table 1).

TABLE 1

|  | Example 1 | | Example 2 | | Comparative Example | |
| --- | --- | --- | --- | --- | --- | --- |
|  | Depth on inside (mm) | Depth on outside (mm) | Depth on inside (mm) | Depth on outside (mm) | Depth on inside (mm) | Depth on outside (mm) |
| 500 km Running | 3.2 | 3.2 | 3.2 | 3.0 | 3.2 | 3.0 |
| 1000 km Running | 2.5 | 2.4 | 2.5 | 2.1 | 2.5 | 2.1 |
| 1500 km Running | 1.9 | 1.7 | 1.9 | 1.3 | 1.9 | 1.3 |

As shown in the Table 1, in the tire according to the comparative example, the depth of the groove obtained after the running has a great difference between the inside in the axial direction and the outside in the axial direction. This indicates that a partial wear is generated on the tire.

In the tire according to the example 1, the depth of the groove has a difference of 0.2 mm between the inside in the axial direction and the outside in the axial direction also at a mileage of 1500 km. In other words, the partial wear of the tire can be suppressed effectively.

In the tire according to the example 2, the partial wear is generated in the same manner as the tire according to the comparative example. Consequently, the point of contact of the phantom circle for defining each corner portion of the groove of the tire is to be positioned at a distance of {fraction (1/10)} or less of the width B of the groove from the phantom normal of the groove.

What is claimed is:

1. A motorcycle tire comprising:
   a tread portion having a tread surface curved outward in a radial direction and formed to define a great arch; and
   a groove constituting a tread pattern formed on the tread surface,
   wherein an internal wall surface of the groove has a substantially U-shaped configuration in which a pair of corner portions are formed to be arcuate surfaces and the groove walls are substantially parallel to each other, and
   the radius of curvature of the arcuate surface constituting one of the corner portions which is positioned on an inside in an axial direction is set to be smaller than that of the arcuate surface constituting the other corner portion which is positioned on an outside in the axial direction.

2. The motorcycle tire according to claim 1, wherein the arcuate surfaces constituting the corner portions have a radii of curvature of 2 mm or more, respectively.

3. The motorcycle tire according to claim 1, wherein a first phantom circle for defining the arcuate surface constituting the corner portion positioned on the inside in the axial direction is inscribed on a second phantom circle for defining the arcuate surface constituting the corner portion positioned on the outside in the axial direction.

4. The motorcycle tire according to claim 3, wherein a phantom point of contact of the first phantom circle and the second phantom circle is positioned on the outside, in the axial direction from a phantom normal which passes through a center of an opening portion of the groove and is orthogonal to a phantom tread line for defining the tread surface, and
   the distance between the phantom normal and the phantom point of contact is equal to or smaller than one tenth of a width of the groove.

5. The motorcycle tire of claim 1 wherein at least 50% of the sum of the length of the groove in the longitudinal direction included in a contact surface formed when a normal load is applied has the substantially U-shaped configuration.

* * * * *